March 2, 1965  G. D. WHITEHOUSE  3,171,547
AUTOMATIC COUPLERS FOR RAIL VEHICLES
Filed Feb. 9, 1962  7 Sheets-Sheet 1
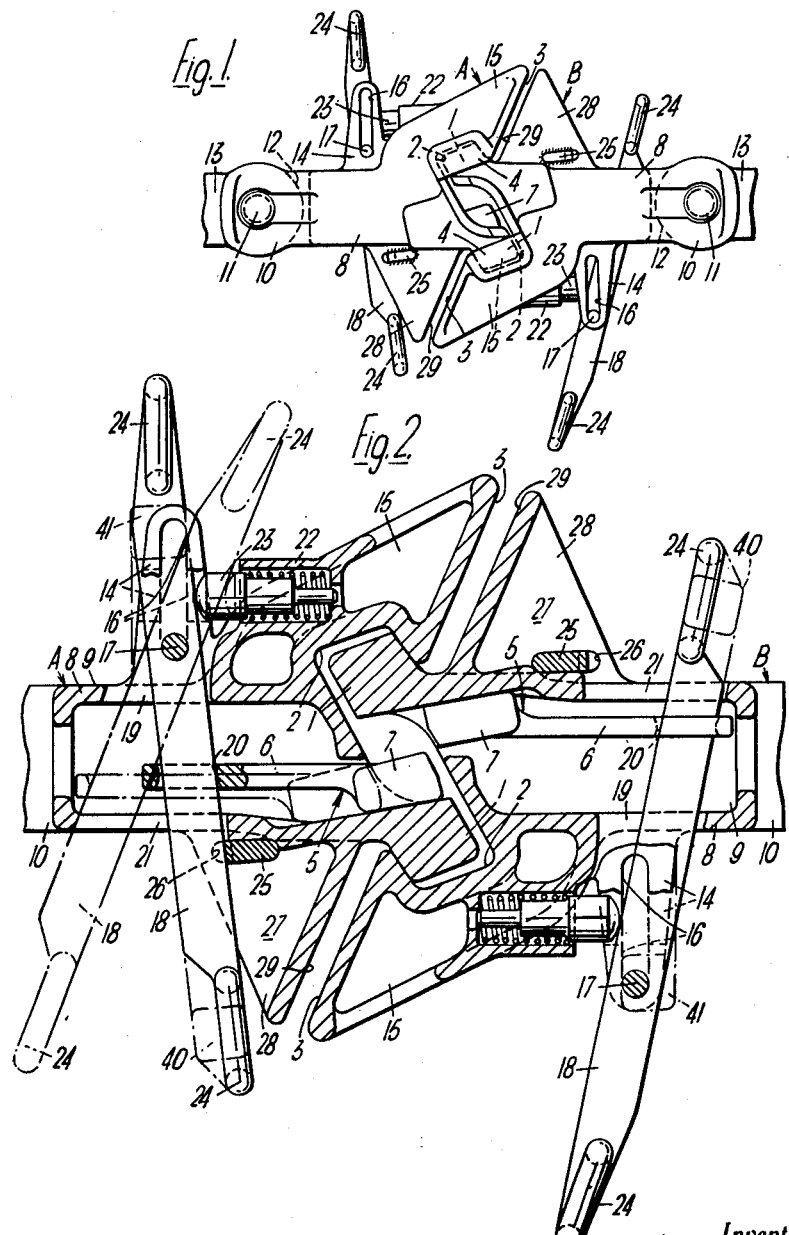

March 2, 1965  G. D. WHITEHOUSE  3,171,547
AUTOMATIC COUPLERS FOR RAIL VEHICLES
Filed Feb. 9, 1962  7 Sheets-Sheet 2

Inventor
Henry D. Whitehouse
By Watson, Cole, Grindle & Watson
Attorneys

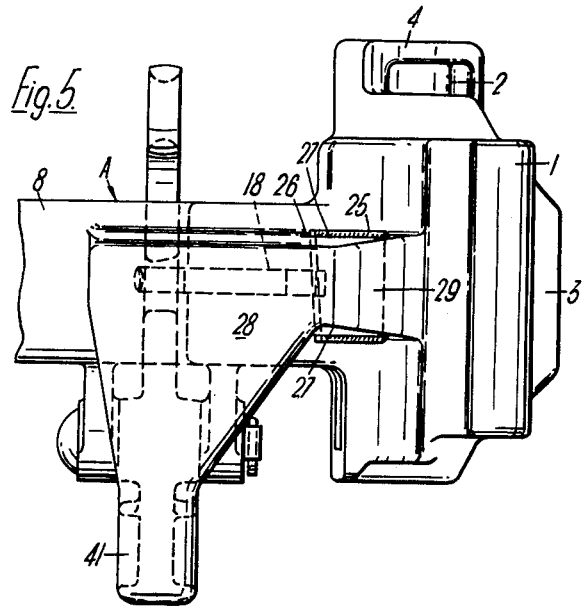
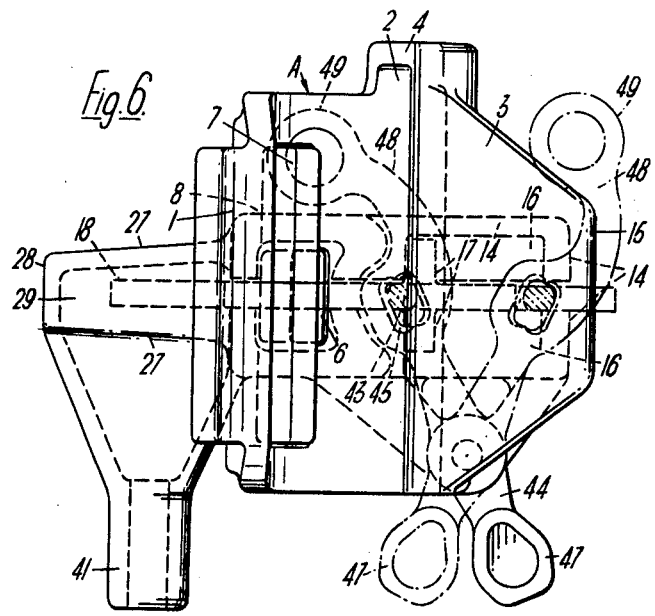

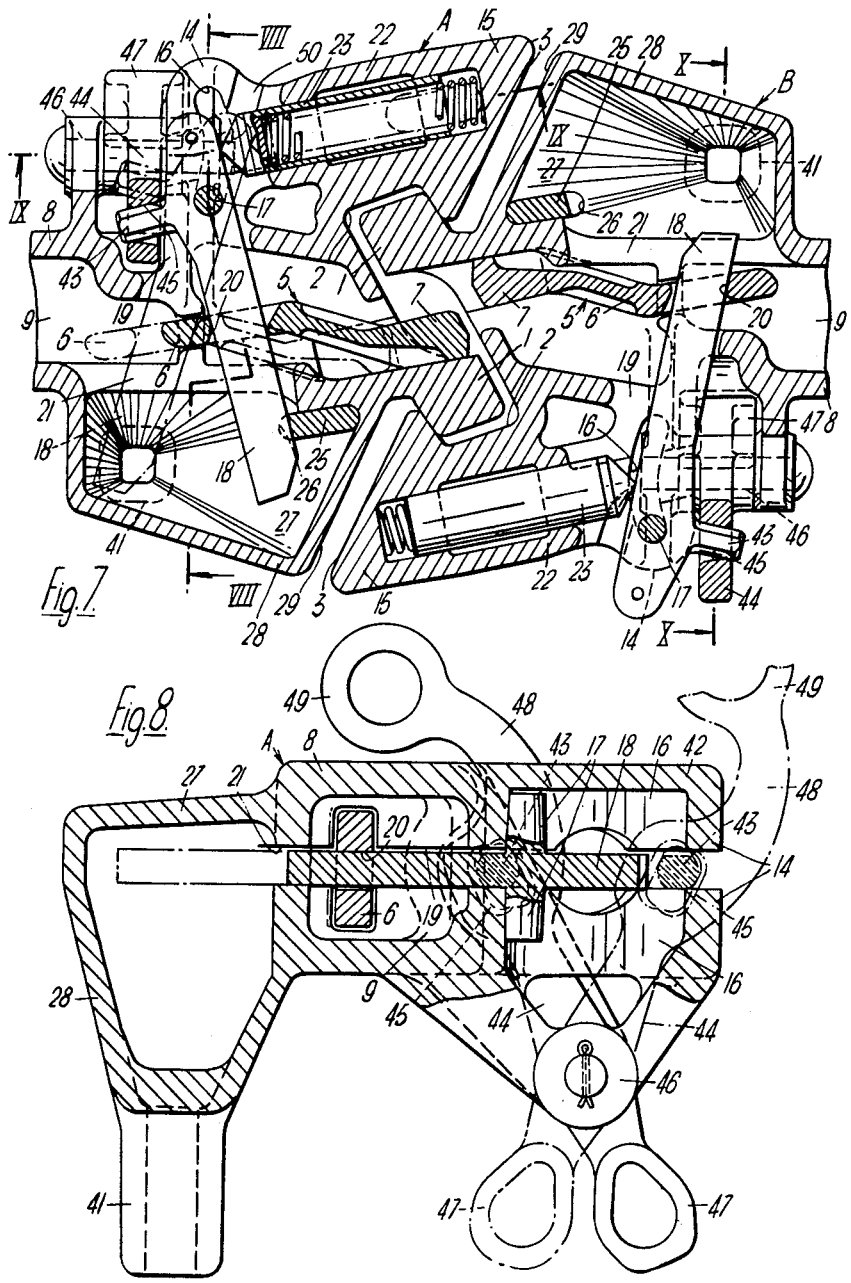

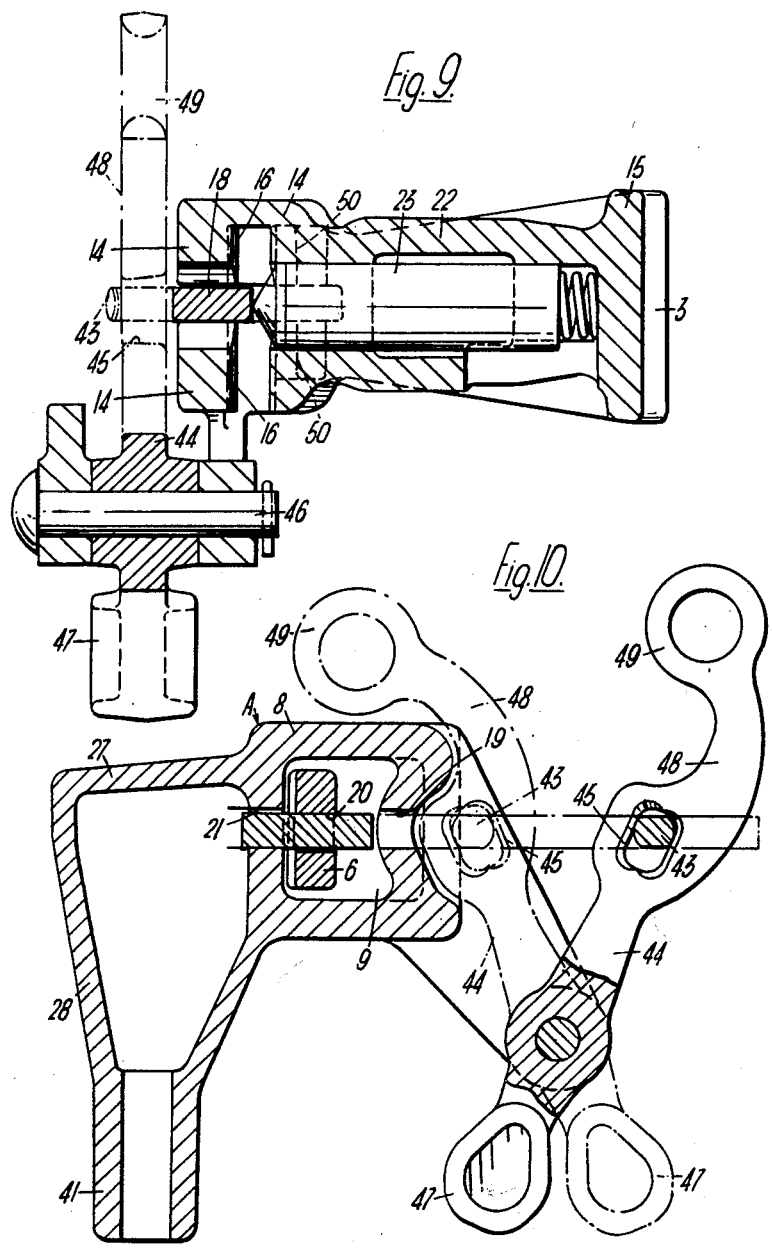

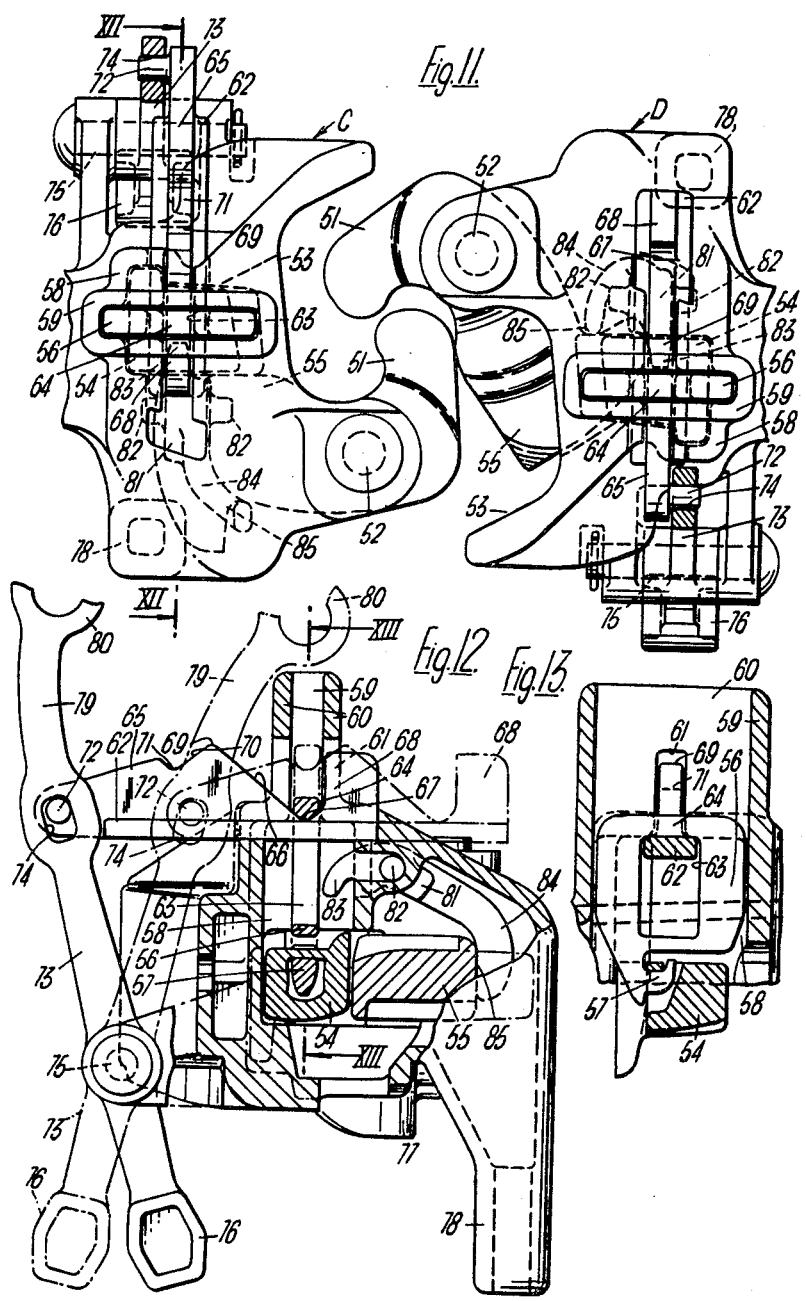

March 2, 1965     G. D. WHITEHOUSE     3,171,547
AUTOMATIC COUPLERS FOR RAIL VEHICLES
Filed Feb. 9, 1962     7 Sheets-Sheet 7

INVENTOR
Glenroy D. Whitehouse

BY Watson, Cole, Grindle & Watson
ATTORNEYS

United States Patent Office 3,171,547
Patented Mar. 2, 1965

3,171,547
AUTOMATIC COUPLERS FOR RAIL VEHICLES
Glenroy D. Whitehouse, Sheffield, England, assignor to English Steel Corporation Limited, Sheffield, England
Filed Feb. 9, 1962, Ser. No. 172,163
Claims priority, application Great Britain, Feb. 14, 1961, 5,359/61; Aug. 2, 1961, 27,973/61
22 Claims. (Cl. 213—100)

This invention relates to automatic couplers for rail vehicles of the type in which a locking member is spring-loaded or urged by gravity towards a locking position in which it prevents withdrawal of a similar mating coupler the locking member of which is also in locking position, the locking member also being movable to a release position in which it permits the mating coupler to be withdrawn, without it being necessary to move the locking member of the mating coupler also to release position.

One object of the invention is to provide an automatic coupler of the type referred to with manually operable means for moving the locking member, against the urge towards locking position, to bring it to and retain it in release position, which means are carried entirely by the coupler itself and are adapted for operation from either side of the coupler, with return of the locking member to locking position being effected only by reverse manual operation of the operating means.

Another object of the invention is to overcome the disadvantages attendant on existing means which are operable manually from either side of the vehicle. For example, in the well-known "Willison" type coupler in which the locking member is spring-urged outwardly from the body of the coupler to a position in which it is adapted to lie alongside the locking member of a similar mating coupler, in order to prevent withdrawal of a fixed nose on each coupler body from a recess in the body of the other coupler, at least one of the locking members must be withdrawn against the spring-urge to enable the couplers to be disengaged, and it has been the practice to provide a coupler of this type with a lever on a horizontal pivot on the coupler body, wtih one arm of the lever extending inside the body and terminating in a lateral projection for engagement with a slot in the locking member, and with the other arm extending outside the coupler body and terminating in an eye for engagement by suitable means for rocking the lever, to enable the locking member to be withdrawn.

For use of such a coupler on mine-cars or like vehicles for underground or industrial transport, the eye is usually connected by a linkage including a chain or cable to a hand-lever or a manually-operable crank, which is pivotally mounted on the adjacent end of the vehicle in a manner permitting operation from either side of the vehicle, for movement of the hand-lever or crank (as the case may be) to a fully operative position, in which position the hand-lever or crank may be retained to hold the locking member in withdrawn position for shunting of the vehicle, the chain or cable being long enough to permit lateral movement of the coupler with respect to the vehicle when the locking member is in locking position without even partial withdrawal of the locking member being effected, yet not so long that upon movement of the hand-lever or crank to the fully operative position the locking member cannot be withdrawn sufficiently for the coupler to be disengaged immediately from a mating coupler.

Although a spring has usually been employed as part of the linkage and prevents undue shock-loading of the chain or cable upon operation to withdraw the locking member, repeated operation is liable to stretch the chain or cable and/or the usual hook connection to the spring, particularly if the hook connection is not welded into a complete loop, as is frequently the practice. In any case, wear in the chain links and the various connections in the linkage or stretching of the cable is bound to take place with repeated operation, and a critical condition may thus be attained in which the hand-lever or crank may be moved to and retained in operative position without the locking member being withdrawn sufficiently for immediate release of a mating coupler, and yet not leave sufficient interlocking of the couplers to prevent release of the mating coupler upon either vehicle carrying the couplers being subjected thereafter to vibration or a sudden pull, for example, when the vehicles are on an incline and, therefore, liable to run away out of control, with consequent danger to life and limb. The provision of means for adjusting the length of the linkage, such as a screw and nut connection or a turnbuckle, enables the linkage to be adjusted periodically to the correct length. However, owing to the movement (often irregular) of vehicles e.g., underground, it is extremely difficult to ensure that adjustment of each and every such linkage is effected before the critical condition may be attained. By providing its lock operating means entirely on the coupler, the present invention eliminates these dangers.

A further object of the invention is to provide an automatic coupler of the general type referred to with means for moving the locking member to bring it to and retain it in release position, as an automatic operation by track-mounted devices.

According to the present invention, an automatic coupler for rail vehicles of the general type referred to is provided with an operating member carried by the coupler and mounted for limited movement transversely of the coupler, together with means extending outside the coupler for application of external forces to move the operating member between its limiting positions, means providing engagement between the operating member and the locking member with provision for relative sliding of the operating member with respect to the locking member, and means rendered operative upon movement of the operating member to one limiting position by an external force for moving the locking member to release position, the means providing engagement between the operating member and the locking member being such that the urge of the locking member towards locking position is applied to the operating member in a direction substantially perpendicular to the direction of movement of the operating member, whereby the locking member will be retained in release position until the operating member is moved to the other limiting position by an oppositely applied external force. Thus the locking member of such a coupler may be moved to release position, at one point along a track on which a vehicle carrying that coupler is standing or travelling, by the application of an external force to the operating member and be retained after removal of that external force until, after shunting of that vehicle has taken place without automatic coupling with any other coupler on any other vehicle, the locking member may be permitted to return to locking position by the application of an external force to move the operating member in the opposite direction, at some other point along the track, for the coupler to be ready for automatic coupling with a coupler on another vehicle, during subsequent marshalling of the vehicles to form a train.

The operating member also may be mounted for movement of the means providing the engagement between the operating member and the locking member in substantially the same direction as the direction of movement of the locking member, and the aforementioned engagement means then be such that the operating member is subjected to the urge of the locking member towards locking position, at least when the operating member is in that limiting position of transverse movement in which the means for moving the locking member into release position is inoperative, whereby movement of the operating member by means of an internal force in opposition to the urge of the locking member towards locking position, without movement of the operating member in the transverse direction, will bring the locking member to release position, in which position it will be retained only as long as the external force is applied. Thus it is possible to effect temporary withdrawal of the locking member, for example, when a shunting operation is to be performed with the locking member re-set in locking position immediately after a mating coupler has been released.

Since the entire mechanism is mounted wholly on the coupler itself, no allowance need be made in any part of the mechanism for relative movement between the coupler and a vehicle on which it is mounted, and any wear in the mechanism is automatically taken up by the urge of the locking member toward locking position.

The means for moving the locking member into release position upon transverse movement of the operating member to one limiting position may comprise a cam-lift on the operating member adapted to co-operate with one end of a slot in the tail of the locking member. Again, it may comprise an oblique slot in the operating member embracing a pin or projection extending into the slot from the tail of the locking member. Yet again, the operating member may comprise a lever extending through elongated slots in the side walls of the hollow body of the coupler and also passing through a slot in a tail on the locking member, the tail and the slot in the tail together forming the engagement means between the operating member, and the lever provided with a pivot guided for transverse movement between limiting positions both of which are disposed to one and the same side of the axis of the tail on the locking member, the axis of the pivot being substantially perpendicular to the direction of movement of the locking member, so that rocking of the lever about the pivot will move the locking member against the urge towards locking position, and the means for moving the locking member upon transverse movement of the operating member may comprise a spring-loaded plunger with its axis parallel to the direction of movement of the locking member and effective to bear on the lever operating member at opposite sides of the lever pivot in the respective limiting positions of the pivot, so as to cause the locking member to be urged towards locking position when the pivot is in one limiting positon and to release position when the pivot is in the other position; or the means for moving the locking member into release position upon transverse movement of the operating member to one limiting position may comprise cam surfaces on the lever operating member and the coupler body, co-operative to cause the lever to assume a position in which it acts against the normal spring or gravity urge of the locking member towards locking position.

Each end of the operating member may be formed or provided with an eye extending outside the coupler for ready engagement by a shunting pole from either side of the vehicle on which the coupler is mounted, for application of an external force in the appropriate direction for effecting transverse movement of the operating member, while enabling the operating member to be kept to a length that does not interfere with the usual rotation of the coupler with respect to the vehicle. Engagement of the eye on either end of a lever operating member also serves for ready application of an external force in the appropriate direction substantially perpendicular to the operating member for effecting rocking of the lever in opposition to the urge of the locking member towards locking position, for effecting temporary withdrawal of the locking member.

Alternatively, or in addition, one end of the operating member may be formed or provided with a projection extending downwardly to terminate below the lowest part of the coupler, and the coupler also provided with a fixed projection extending downwardly to substantially the same level and disposed at the other side of the coupler substantially in the plane of movement of the projection on the operating member, for transverse movement of the operating member to be effected by relative movement between the projections under the influence of a track-mounted device.

Again, the coupler may be provided with a horizontal pivot extending parallel to and at one side of the axis of the coupler, together with a lever on the pivot also having a pin-and-slot pivotal connection to the transverse operating member and terminating in a free end projecting below the lowest part of the coupler, and a fixed projection extending downwardly to substantially the same level as the free end of the lever and disposed at the other side of the coupler substantially in the plane of movement of the downwardly projecting lever, for transverse movement of the operating member to be effected in consequence of relative movement between the downwardly projecting end of the lever and the fixed projection under the influence of a track-mounted device, free of any moment tending to increase the resistance to movement of the operating member, which would not be the case with a projection extending rigidly from the operating member. The lever on the horizontal pivot may also project upwardly from the pivot to terminate in an eye accessible from either side of the coupler, in addition to or, more conveniently, in place of an eye at each end of the operating member, for transverse movement of the operating member to be effected in consequence of rocking of the lever manually. If no eyes are provided on the operating member, temporary withdrawal of the locking member, i.e. with return to locking position immediately after release of a mating coupler, may be effected by reciprocation of the eye on the lever on the horizontal pivot.

If the operating member comprises a lever that may be rocked about a pivot by the application of an external force in opposition to the urge of the locking member to locking position, the pin-and-slot pivotal connection is preferably axially coincident with the pivot for the operating member, to result in negligible relative movement between the pin and the slot of the pin-and-slot connection. Thus, with an operating member on a horizontal pivot for operation of the operating member by rocking in a vertical plane, the pin of the pin-and-slot connection or an extension of that pin may comprise the horizontal pivot for the operating member; or, with an operating member on a vertical pivot for operation of the locking member by rocking in a horizontal plane, the pin of the pin-and-slot connection may extend perpendicular to the vertical pivot from the nearest part of the side of the operating member.

While any of the above arrangements may be applicable to any known type of coupler, with appropriate minor modification of the design of the coupler body and the locking member or the tail of the latter, the invention will now be described in detail in relation to those arrangements that are readily applicable to particular types of existing couplers, and with reference to the accompanying drawings, in which FIGURE 1 is a plan of two automatic couplers of the "Willison" type intended primarily for manual operation and shown mated together, but with one coupler set for release of the mating coupler;

FIGURE 2 is an enlarged horizontal section corresponding to FIGURE 1;

FIGURE 3 corresponds to FIGURE 2 but shows a modification of the mechanisms for operating the locking members;

FIGURE 5 is an enlarged side view of the left-hand coupler of FIGURE 4;

FIGURE 6 is a view taken from the right-hand side of FIGURE 5;

FIGURE 7 is an enlarged horizontal section corresponding to FIGURE 4;

FIGURES 8 to 10 are enlarged vertical sections taken on the lines VIII—VIII, IX—IX and X—X respectively of FIGURE 7;

FIGURE 11 is a plan of the heads of two automatic couplers of the "knuckle" type intended primarily for operation by track-mounted devices and shown with one coupler set for release of the mating coupler;

FIGURE 12 is a vertical section taken on the line XII—XII of FIGURE 11;

FIGURE 13 is a fragmentary vertical section taken on the line XIII—XIII of FIGURE 12.

Figure 3:
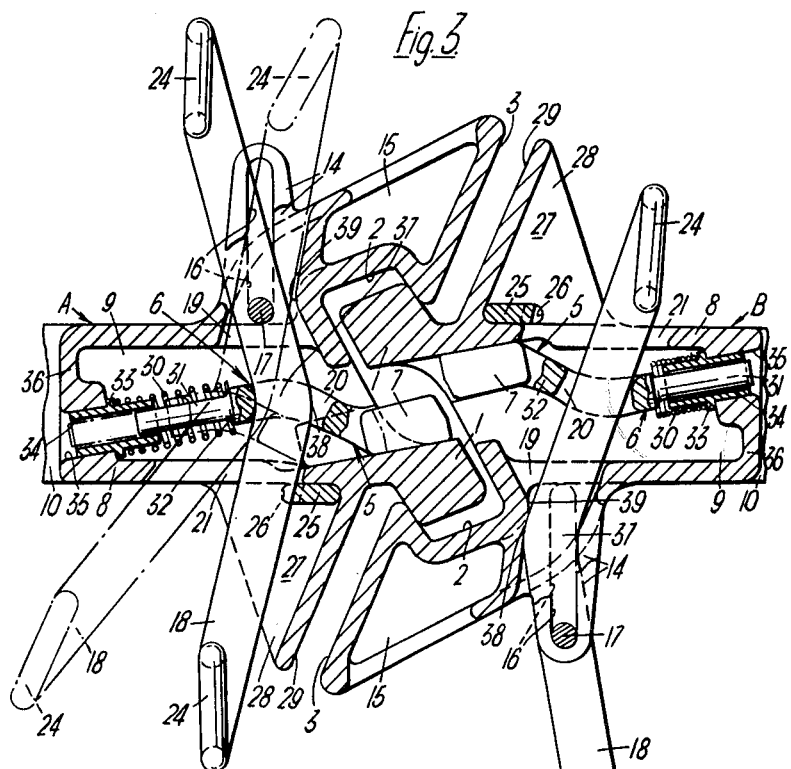
Figure 4:
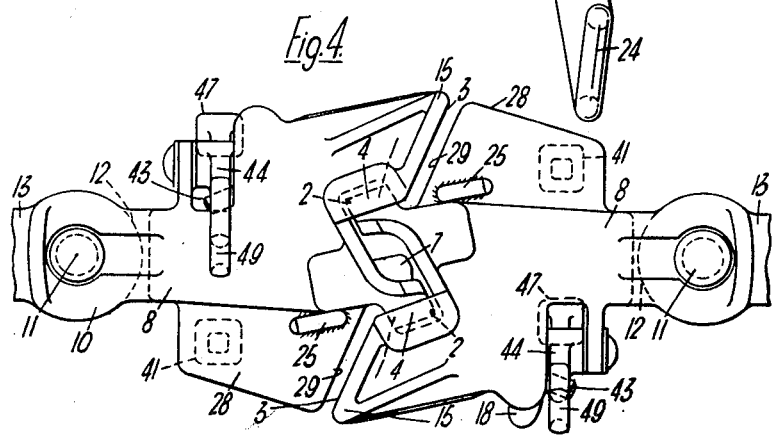
FIGURE 4 is a plan of two automatic couplers of the "Willison" type intended primarily for operation by track-mounted devices and shown mated together, but with one coupler set for release of the mating coupler.
Figure 14:
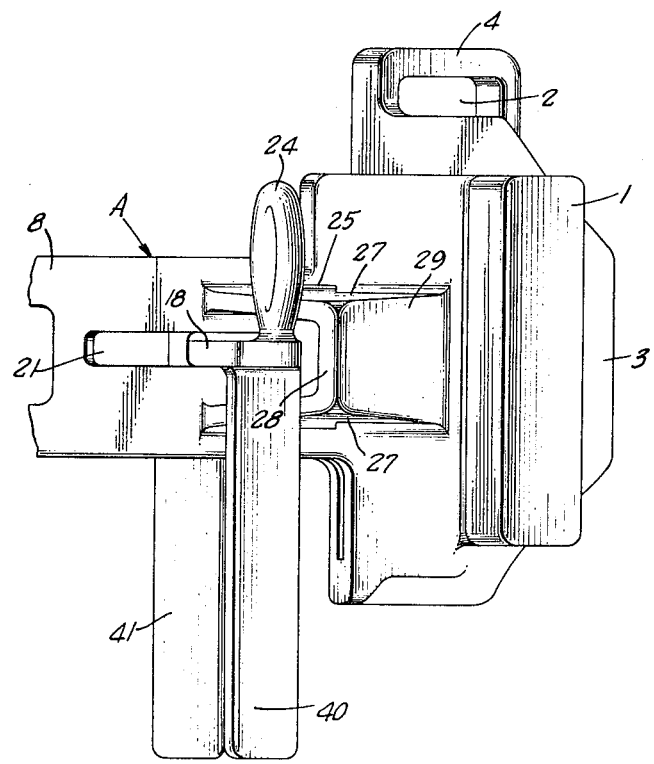
FIGURE 14 is an enlarged fragmentary side elevation of one end of the coupling A of FIGURE 2.

In FIGURES 1 and 2, each of a pair of "Willison" type couplers A, B has a fixed nose 1 for engagement in a recess 2 extending behind a vertical guide surface 3 on the other, the upper side of each recess being closed by a fixed cheek 4 limiting appreciable relative vertical movement between the couplers when mated. A locking member 5 in each coupler has a tail 6 integral with a head 7 and is movable to a position in which the head can lie alongside the head of the locking member of a similar mating coupler, the two heads together substantially filling the space between the fixed noses 1 in order to prevent withdrawal of either nose from the corresponding recess 2. The locking member of the coupler A is shown in this position, while the locking member of the coupler B is shown withdrawn with the head 7 in a position in which relative movement between the couplers is permitted for the noses 1 to be withdrawn from their respective recesses 2.

The body 8 of each coupler has a hollow portion 9 which houses the tail 6 of the locking member and extends from just behind the recess 2 to just forward of the forked end 10 of the body which is pivotally secured by a bolt 11 to the usual head 12 of the draw-bar 13 of a rail vehicle (not shown).

A pair of parallel wings 14 cast integrally with each coupler body lie one above the other at one side of the body, behind the usual side extension 15 of the body providing the guide surface 3, and the wings are formed with transverse guide slots 16 for a pivot 17 projecting above and below an operating member consisting of a flat bar-section lever 18 lying between the wings. The lever 18 extends through an elongated slot 19 in the adjacent side of the coupler body 8—the mutually-facing surfaces of the wings 14 continuing into the upper and lower edges of the slot 19—through a slot 20 in the tail 6 of the locking member 5 with only slight clearance and through a considerably elongated slot 21 in the other side of the coupler body. A housing 22 for a spring-loaded plunger 23 is also cast integrally with the body and emerges rearwardly from the side extension 15, to open alongside the slotted wings 14 for the plunger to bear on the lever 18 mid-way between the ends of the slots 16. Each end of the lever 18 is provided with an eye 24 for ready engagement by a shunting pole (not shown) from either side of the vehicle on which the coupler is mounted, for application of an external force in the appropriate direction for effecting transverse movement of the lever. The spring loaded plunger 23 thus exemplifies any suitable resilient means acting longitudinally against the operating member 18 at a given location spaced transversely of the coupler body from the locking member so that the pivot 17 is shiftable with the operating member from one transverse side of the locking member to the other.

With the pivot 17 in the limiting position shown in coupler A the spring-loaded plunger 23 is effective to rock the lever 18 to urge the locking member 5 outwardly into locking position. A flat setting wedge 25, passing through elongated slots 26 in the upper and lower cheeks 27 of another side extension 28 of the coupler body providing another vertical guide surface 29 behind the nose 1, is driven down initially to take up casting and machining tolerances and ensure that the head 7 of the locking member cannot project beyond the nose in the locking position, the wedge being welded up after setting and then cropped off close to the cheeks 27 to prevent displacement of the wedge, whether accidentally or otherwise. Thereafter, the spring-loaded plunger 23 takes up what little wear occurs in the slots 16 and on the pin 17 during the normal working life of the coupler, without appreciable change in the actual locking position of the locking member. The pivot 17 and slots 16 thus provide a transversely shiftable pivotal connection between the operating member 18 and the coupler body 8.

With the pivot 17 in the limiting position shown in the coupler B (brought about by transverse movement of the lever 18 from the position shown in coupler A) the spring-loaded plunger 23 is effective to rock the lever 18 to withdraw the locking member 5 into release position and retain it, until such time as the pivot is moved back to the limiting position shown in coupler A.

Also with the pivot 17 in the limiting position shown in coupler A, the lever 18 may be rocked (as indicated in broken line in the coupler A in FIGURE 2) manually from either side of the coupler (by application of manual effort to either eye 24 substantially perpendicular to the lever), against the urge of the plunger 23 and without movement of the lever lengthwise of itself, to effect temporary withdrawal of the locking member 5 for such time as the manual effort remains applied to either eye.

In FIGURE 3, the spring-loaded plunger 23 has been replaced by a spring 30 encircling a cylindrical bar portion 31 of the tail 6 of the locking member 5 and compressed between an enlarged portion 32 of the tail behind the head 7 and an intermediate external flange 33 on a sleeve 34 for guiding the tail portion 31 into a bore 35 in a transverse wall 36 closing the hollow portion 9 of the coupler body 8. The operating lever 18 has been bent at 37 so as to afford a cam surface 38 for co-operation with a cam surface 39 on the coupler body, when the pivot 17 for the lever is moved from the limiting position shown in coupler B, to cause the lever to assume and be retained in a position in which it acts against the urge of the spring 30 sufficiently to withdraw the locking member to release position. The slot 20 (now in the enlarged portion 32 of the tail 6) has been afforded greater clearance than in FIGURE 2, in order to accommodate the bend 37 when with the pivot 17 in the limiting position shown in the coupler A the lever 18 is rocked (as indicated in broken line in the coupler A) without movement lengthwise of itself, to effect temporary withdrawal of the locking member 5 by direct lever action against the urge of the spring 30.

While the couplers of FIGURES 1 and 2 and of FIGURE 3 are intended primarily for manual operation, they are capable of being adapted for automatic operation by track-mounted devices. Thus, as shown in broken line in FIGURE 2 only—but equally applicable in FIGURE 3—one end of the lever 18 may be provided with a projection 40 extending downwardly to terminate below the lowest part of the coupler, and the coupler also provided with a fixed projection 41 extending downwardly to substantially the same level and disposed at the other side of the coupler substantially in the plane of movement of the projection 40, for appropriate transverse movement of the lever to be effected by relative movement between the projections under the influence of a track-mounted device (not shown). However, rocking of the lever 18 as it is moved between its limiting positions tends to impose a moment on the lever adding to the resistance of the projection 40 to movement relative to the fixed projection 41. Thus, if the primary intention is to provide for automatic operation by track-mounted devices, the coupler of FIGURES 4 to 10 should be adopted, as this coupler overcomes this disadvantage, as well as having additional advantages.

In FIGURES 4 to 10, like reference numerals have been used for parts already described both in construction and operation in relation to FIGURES 1 and 2. However, since the eyes 24 have been omitted (for reasons to be given presently) and shortening of the operating lever 18 has thus been possible, considerably more of the mechanism has been enclosed within the hollow body portion 9, the side extension 28 and the wings 14, for the better exclusion of dirt, as well as for generally increased strength and cleaner appearance; in particular, the wings 14 have been blended into the housing 22 for the spring-loaded plunger, which is accommodated more completely within the extension 15, and an integral cover 42 has been provided for the slot 16 in the upper wing.

The extension 28, providing the guide surface 29 and accommodating the setting wedge 25, has been extended rearwardly to form a box, not only to accommodate the lever 18 in all its positions but also to carry the fixed projection 41. However, instead of providing a projection (40) extending rigidly from the lever 18, the lever is provided with a pivot pin 43 axially coincident with the pivot 17 but extending perpendicular to the pivot 17 from the nearest part of the rear side of the lever 18, the pin 43 being pivotally connected to a lever 44 by a slot 45 in that lever, and the lever 44 extends downwardly to a horizontal pivot 46 extending parallel to and at one side of the axis of the coupler, and beyond to terminate in an enlarged end 47 at substantially the same level as the fixed projection 41, the enlarged end 47 having overall horizontal cross-sectional dimensions similar to those of the fixed projection. Relative movement between the end 47 of the lever 44 and the fixed projection 41 may be effected by track-mounted devices to bring about appropriate movement of the lever 18 lengthwise of itself, and the pin-and-slot connection 43, 45 ensures that no moment is imposed on the lever 18, as is the case with a projection extending rigidly from the lever 18 (as in FIGURE 2).

While the absence of eyes 24 prevents direct manual rocking of the lever 18, similar manual operation of the mechanism is made possible by the provision of an upward extension 48 of the lever 44, terminating in an eye 49 readily accessible for engagement by a shunting pole (not shown) from either side of the vehicle. Temporary withdrawal of the locking member 5 may be effected by reciprocation of the eye 49 on the lever 44 from the full-line position in FIGURE 8 to the broken-line position (that is, the full-line position in FIGURE 10) and back again.

The slots 16 are slightly curved towards their ends away from the plunger 23, to discourage any tendency for the lever 18 to remain in the dead-centre position, i.e. the position in which the line of action of the plunger 23 passes through the axis of the pivot 17, should the lever 44 not be moved fully from one extreme position to the other. The condition of the coupler (locking member in locking position or release position) may be perceived readily from the position of the eye 49, regardless of whether with respect to the vehicle the coupler is leading or trailing; in fact, more readily than in the case of the couplers of FIGURES 1 and 2 or FIGURE 3, where each coupler has an eye at each side.

Referring to FIGURES 7 and 9, it will be seen that a pair of slots 50 lead into the slots 16 from the adjacent side of the coupler. These slots 50 are for the purpose of admitting the pivot pins 17 to the slots 16 during assembly of the coupler, the pivot pins 17 (see also FIGURES 8 and 10) being formed integral with the lever 18, as also is the pin 43. Once the pivot pins 17 have been admitted into the slots 16, the plunger 23 prevents accidental withdrawal into the slots 50.

The box-like extension 28 extends beyond the fixed projection 41 so as to accommodate the lever 18 when (as indicated in broken line in the coupler A FIGURE 7) that lever rocks about the pivot 17, without movement lengthwise of itself, in the event of the head 7 of the locking member 5 being buffed during shunting operations performed with the locking member in locking position, the spring-loaded plunger 23 yielding as the lever rocks and being effective to return the locking member to locking position when buffing ceases.

In FIGURE 11, each of a pair of "knuckle" type couplers C. D has a knuckle 51 mounted on a vertical pivot 52 at one side of a recess 53 for receiving the knuckle on a similar mating coupler. A locking member 54 in each coupler is guided for vertical movement upwardly or downwardly into a position in which it lies alongside an arm 55 of the knuckle 51 and prevents swinging of the knuckle, so that withdrawal of the knuckle of a similar mating coupler from the recess 53 is prevented if the arm of the knuckle of that mating coupler is also obstructed by its locking member.

A plate link or tail 56 (see also FIGURES 12 and 13) having the usual hook connection 57 with the locking member 54, extends upwardly through a pocket 58 for accommodating the locking member when raised and into a guide 59, the sides 60 of which have slots 61 for passage of an operating member consisting of a slide 62, and the tail has a slot 63 forming a bridge 64 spanning the slide. The slide carries a cam 65 for effecting lifting and lowering of the locking member 54 in consequence of transverse movement of the slide (i.e. movement of the slide lengthwise of itself), the profile of the cam having an incline 66 rising from a position 67 alongside a stop 68 to a peak 69 and an incline 70 falling from the peak to a valley 71 at an intermediate level.

A pin 72 projecting from the cam is pivotally connected to a lever 73 by a slot 74 and the lever extends downwardly from the slot to a horizontal pivot 75 parallel to and to one side of the axis of the coupler, and beyond to terminate in an enlarged end 76 below the lowest part 77 of the coupler the body carries a fixed projection 78 extending downwardly to substantially the same level as the enlarged end 76 of the lever 73, the overall horizontal cross-sectional dimensions of the enlarged end and the fixed projection.

The lever 73 has an upward extension 79 terminating in an eye 80, which is accessible for ready engagement by a shunting pole (not shown) from either side of a vehicle (not shown) on which the coupler is mounted.

A knuckle thrower 81 has trunnions 82 pivoted in the coupler body, a beak 83 projecting into the pocket 58 and a finger 84 hanging down into a notch 85 in the knuckle arm 55.

When the lever 73 is rocked about its pivot 75 from the full-line position in FIGURE 12 (corresponding to the position in coupler C in FIGURE 11) to the broken-line position in FIGURE 12 (corresponding to the position in coupler D in FIGURE 11), whether manually by means of shunting pole engaged in the eye 80 or automatically by means of a track device moving the enlarged end 76 of the lever further away from the fixed projection 78, the slide 62 is moved to cause the bridge 64 of the tail 56 to follow the profile of the cam 65 and lift the rocking member 54 from locking position. As the bridge 64 climbs the incline 66 it reaches the same level as the valley 71 and at this position the locking member 54 makes initial contact with the beak 83 of the knuckle thrower 81, as well as clearing the arm 55 for swinging of the knuckle 51 under the influence of the knuckle thrower as the bridge 64 climbs to the peak 69, the final drop down the incline 70 to rest in the valley 71 lowering the locking member away from the beak 83 (now in raised position), so that the knuckle thrower will be free to swing in the event of the arm 55 being buffed and swung by the knuckle of a similar coupler during shunting operations.

When the lever 73 is rocked back to the full-line position in FIGURE 12, whether manually by means of a shunting pole engaged in the eye 80 or automatically by means of another track device moving the enlarged end 76 of the lever towards the fixed projection 78, the bridge 64 of the tail 56 returns over the peak 69 of the cam profile and lowers the locking member 54 on to the arm 55 of the knuckle 51 (which must be in open position by virtue of the bridge 64 having passed again over the peak 69 and the locking member consequently having rocked the knuckle thrower 81), and the locking member remains in this "lock-set" position until the knuckle is swung to closed position by buffing during a subsequent shunting operation, when the locking member falls alongside the arm to prevent re-opening movement of the knuckle.

Temporary release of the locking member, with return to "lock-set" position may be effected by reciprocation of the eye 80 from the full-line position in FIGURE 12 to the broken-line position and back again.

What I claim is:

1. An automatic coupler of the "Willison" type provided with elongated slots in the side walls of the hollow body of the coupler, and a slot in the tail of the locking member, all three slots extending in the direction of movement of the locking member, together with a lever passing through the slots in the coupler body and the slot in the tail of the locking member, a pivot fixed to the lever and extending perpendicular to the direction of movement of the locking member, guide slots for the pivot extending transversely of the coupler between closed ends at one and the same side of the axis of the tail of the locking member, a spring-loaded plunger mounted in the coupler body, with the axis of the plunger parallel to the direction of movement of the locking member and located intermediate the closed ends of the guide slots for the lever pivot, a projection extending downwardly from one end of the lever to terminate below the lowest part of the coupler, and a projection extending downwardly to substantially the same level as and at the other side of the coupler axis to the projection on the lever.

2. An automatic coupler of the "Willison" type provided with elongated slots in the side walls of the hollow body of the coupler, and a slot in the tail of the locking member, all three slots extending in the direction of movement of the locking member, together with a lever passing through the slots in the coupler body and the slot in the tail of the locking member, a pivot fixed to the lever and extending perpendicular to the direction of movement of the locking member, guide slots for the pivot extending transversely of the coupler between closed ends at one and the same side of the axis of the tail of the locking member, cam surfaces on the lever and the coupler body for co-operation with each other upon movement of the lever pivot to one limiting position to cause the lever to assume a position in which it acts against the normal urge of the locking member towards locking position, a projection extending downwardly from one end of the lever to terminate below the lowest part of the coupler, and a projection extending downwardly to substantially the same level as and at the other side of the coupler axis to the projection on the lever.

3. An automatic coupler of the "Willison" type provided with elongated slots in the side walls of the hollow body of the coupler, and a slot in the tail of the locking member, all three slots extending in the direction of movement of the locking member, together with a lever passing through the slots in the coupler body and the slot in the tail of the locking member, a pivot fixed to the lever and extending perpendicular to the direction of movement of the locking member, guide slots for the pivot extending transversely of the coupler between closed ends at one and the same side of the axis of the tail of the locking member, a spring-loaded plunger mounted in the coupler body, with the axis of the plunger parallel to the direction of movement of the locking member and located intermediate the closed ends of the guide slots for the lever pivot, a horizontal pivot carried by the coupler body and extending parallel to and at one side of the axis of the coupler, a lever on the pivot extending downwardly and terminating in a free end projecting below the lowest part of the coupler, a pin-and-slot pivotal connection between the tranverse lever and the downwardly-extending lever, and a projection disposed at the other side of the coupler substantially in the plane of movement of the downwardly-extending lever and extending downwardly to substantially the same level as the free end of the downwardly-extending lever.

4. An automatic coupler as in claim 3, wherein the downwardly-extending lever also projects upwardly from the pivot to terminate in an eye accessible from either side of the coupler.

5. An automatic coupler as in claim 3, wherein the upper end of the downwardly extending lever terminates in an eye accessible from either side of the coupler.

6. An automatic coupler of the "Willison" type provided with elongated slots in the side walls of the hollow body of the coupler, and a slot in the tail of the locking member, all three slots extending in the direction of movement of the locking member, together with a lever passing through the slots in the coupler body and the slot in the tail of the locking member, a vertical pivot fixed to the lever, guide slots for the pivot extending transversely of the coupler between closed ends at one and the same side of the axis of the tail of the locking member, a spring-loaded plunger mounted in the coupler body, with the axis of the plunger parallel to the direction of movement of the locking member and located intermediate the closed ends of the guide slots for the lever pivot, a horizontal pivot carried by the coupler body and extending parallel to and at one side of the axis of the coupler, a lever on the pivot extending downwardly and terminating in a free end projecting below the lowest part of the coupler, a pin extending perpendicular to the vertical pivot from the nearest part of the side of the transverse lever opposite to the spring-loaded plunger, a slot in the downwardly-extending lever embracing the pin on the side of the transverse lever, and a projection disposed at the other side of the coupler substantially in the plane of movement of the downwardly-extending lever and extending downwardly to substantially the same level as the free end of the downwardly-extending lever.

7. An automatic coupler as in claim 6, wherein the downwardly-extending lever also projects upwardly from the pivot to terminate in an eye accessible from either side of the coupler.

8. An automatic coupler of the "Willison" type in which a locking member is normally urged outwardly from the hollow body of the coupler to a position in which it lies alongside the locking member of a similar mating coupler, and in which an operating lever for withdrawing the locking member engages a slot in a tail on the locking member, comprising elongated slots through the sidewalls of the body of the coupler in alignment with the slot in the tail on the locking member, all three slots extending in the direction of movement of the locking member, a bar-like operating lever slidably disposed through the slots in the coupler body and the slot in the tail on the locking member for movement transversely to that of the locking member, a vertical pivot on the operating lever, guide slots for the pivot in the coupler body extending transversely between closed ends at one and the same side of the axis of the tail on the locking member, and a spring loaded plunger mounted in the coupler body and bearing on the operating lever, with the axis of the plunger parallel to the direction of movement of the locking member and located intermediate the closed ends of the guide slots for the lever pivot.

9. An automatic coupler as in claim 8, wherein the operating lever is provided with an eye at each end externally of the coupler body.

10. An automatic coupler of the "Willison" type in which a locking member is spring urged outwardly from the hollow body of the coupler to a position in which it lies alongside the locking member of a similar mating coupler, and in which an operating lever for withdrawing the locking member against the spring urge engages a slot in a tail on the locking member, comprising elongated slots through the body of the coupler in alignment with the slot in the tail on the locking member, all three slots extending in the direction of movement of the locking member, a bar like operating lever passing through the slots in the coupler body and the slot in the tail on the locking member for movement transversely to the movement of the locking member, a vertical pivot on the operating lever, guide slots for the pivot in the coupler body extending transversely between closed ends at one and the same side of the axis of the tail on the locking member, and cooperating cam surfaces on the operating lever and the coupler body for rocking the operating lever against the spring urge on the locking member when the pivot is moved from one end of the guide slots to the other.

11. An automatic coupler as in claim 10, wherein the operating lever is provided with an eye at each end externally of the coupler body.

12. An automatic coupler of the "Willison" type in which a locking member is normally urged outwardly from the hollow body of the coupler to a position in which it lies alongside the locking member of a similar mating coupler, and in which an operating lever for withdrawing the locking member engages a slot in a tail on the locking member, comprising elongated slots through the sidewalls of the body of the coupler in alignment with the slot in the tail on the locking member, all three slots extending in the direction of movement of the locking member, a bar like operating lever passing through the slots in the coupler body and the slot in the tail on the locking member for movement transversely to the movement of the locking member, a vertical pivot on the operating lever, guide slots for the pivot in the coupler body extending transversely between closed ends at one and the same side of the axis of the tail on the locking member, a spring loaded plunger mounted in the coupler body and bearing on the operating lever, with the axis of the plunger parallel to the direction of movement of the locking member and located intermediate the closed ends of the guide slots for the lever pivot, a projection extending downwardly externally of the coupler body from one end of the operating lever to terminate below the lowest part of the coupler body, and a projection extending downwardly and rigidly from the coupler body to substantially the same level as and at the other side of the coupler axis to the projection of the operating lever.

13. An automatic coupler of the "Willison" type in which a locking member is normally urged outwardly from the hollow body of the coupler to a position in which it lies alongside the locking member of a similar mating coupler, and in which an operating lever for withdrawing the locking member engages a slot in a tail on the locking member, comprising elongated slots through the sidewalls of the body of the coupler in alignment with the slot in the tail on the locking member, all three slots extending in the direction of movement of the locking member, a bar like operating lever passing through the slots in the coupler body and the slot in the tail on the locking member for movement transversely to the movement of the locking member, a vertical pivot on the operating lever, guide slots for the pivot in the coupler body extending transversely between closed ends at one and the same side of the axis of the tail on the locking member, a spring loaded plunger mounted in the coupler body and bearing on the operating lever, with the axis of the plunger parallel to the direction of movement of the locking member and located intermediate the closed ends of the guide slots for the lever pivot, a horizontal pivot carried by the coupler body and extending parallel to the axis of the coupler and at the same side as the guide slots for the operating lever pivot, a lever on the pivot extending downwardly and terminating in a free end projecting below the lowest part of the coupler body, a pin-and-slot pivotal connection between the operating lever and the downwardly extending lever, and a projection extending rigidly downwards from the coupler body to substantially the same level as and at the other side of the coupler axis to the free end of the downwardly extending lever.

14. An automatic coupler of the "Willison" type in which a locking member is normally urged outwardly from the hollow body of the coupler to a position in which it lies alongside the locking member of a similar mating coupler, and in which an operating lever for withdrawing the locking member engages a slot in a tail on the locking member, comprising elongated slots through the sidewalls of the body of the coupler in alignment with the slot in the tail on the locking member, all three slots extending in the direction of movement of the locking member, a bar like operating lever passing through the slots in the coupler body and the slot in the tail on the locking member for movement transversely to the movement of the locking member, a vertical pivot on the operating lever, guide slots for the pivot in the coupler body extending transversely between closed ends at one and the same side of the axis of the tail on the locking member, a spring loaded plunger mounted in the coupler body and bearing on the operating lever, with the axis of the plunger parallel to the direction of movement of the locking member and located intermediate the closed ends of the guide slots for the lever pivot, a horizontal pivot carried by the coupler body and extending parallel to the axis of the coupler and at the same side as the guide slots for the operating lever pivot, a lever on the pivot extending downwardly and terminating in a free end projecting below the lowest part of the coupler body, a horizontal pin on the operating lever extending from the nearest part of the vertical pivot opposite to the spring loaded plunger, a slot in the downwardly extending lever embracing the pin on the operating lever, and a projection extending rigidly downwards from the coupler body to substantially the same level as and at the other side of the coupler axis to the free end of the downwardly extending lever.

15. An automatic coupler as in claim 14, wherein the upper end of the downwardly extending lever terminates in an eye accessible from either side of the coupler.

16. An automatic coupler of the "knuckle" type in which a tail of a locking member is linked to an operating member for lifting the locking member from a position in which it prevents swinging of the knuckle, comprising a guide for the tail extending upwardly from the coupler body, elongated vertical slots in the sides of the guide and in the tail, a bar like operating slide extending transversely of the coupler through the slots in the guide and the slot in the tail for movement transversely of the movement of the operating member, a cam lift of the operating slide engaging the upper end of the slot in the tail, a horizontal pivot carried by the coupler body and extending parallel to and at one side of the axis of the coupler, a lever on the pivot extending downwardly and terminating in a free end projecting below the lowest part of the coupler body, a pin projecting horizontally from one end of the slide, a slot in the lever embracing the pin, and a projection extending rigidly downwards from the coupler body to substantially the same level as and at the other side of the coupler axis to the free end of the lever.

17. An automatic coupler as in claim 16, wherein the upper end of the lever terminates in an eye accessible from either side of the coupler.

18. An automatic coupler comprising a coupler body, a locking member carried by said body for movement longitudinally thereof between predetermined locking and released positions, an operating member supported by said body for translation or movement transversely to the movement of said locking member, said operating member having a transverse sliding connection with said locking member, and cooperating cam surfaces on the operating member and the coupler body for rocking the operating member to cause movement of said locking member to its release position incident to said translational movement of the operating member in a given direction.

19. An automatic coupler as defined in claim 18, including means affording a transversely shiftable pivotal connection between said operating member and said coupler body, said pivotal connection being movable with said operating member, said pivotal connection normally being transversely displaced to one side of the longitudinal path of movement of said locking member to longitudinally move said locking member responsive to angular movement of said operating member about said pivotal connection.

20. An automatic coupler as defined in claim 19, including resilient means acting longitudinally against said operating member at a fixed transverse location on the coupler body normally spaced from said pivotal connection, said pivotal connection being shiftable with the operating member between operative positions on opposite transverse side of said fixed location, whereby to reverse the direction of the force transmitted through said operating member from the resilient means to the locking member.

21. An automatic coupler comprising a coupler body, a locking member carried by said body for movement longitudinally thereof between predetermined locking and release positions, an operating member supported by said body for translational movement transversely to the movement of said locking member, and having a transverse sliding connection with said locking member and means affording a transversely shiftable pivotal connection between said operating member and said coupler body, said pivotal connection being movable with said operating member, said pivotal connection normally being transversely displaced to one side of the longitudinal path of movement of said locking member to longitudinally move said locking member responsive to angular movement of said operating member about said pivotal connection.

22. An automatic coupler as defined in claim 21, including resilient means acting longitudinally against said operating member at a fixed transverse location on the coupler body normally spaced transversely from said pivotal connection, said pivotal connection being shiftable with the operating member between operative positions on opposite transverse sides of said fixed location, whereby to reverse the direction of the force transmitted through said operating member from the resilient means to the locking member.

References Cited by the Examiner
UNITED STATES PATENTS

| | | | |
|---|---|---|---|
| 1,507,037 | 9/24 | Van Dorn | 213—100 |
| 1,647,497 | 11/27 | Blackmore | 213—100 |
| 1,647,498 | 11/27 | Anliker et al. | 213—100 |
| 1,904,171 | 4/33 | Robinson | 213—100 |
| 1,956,609 | 5/34 | Bazeley | 213—100 |
| 2,023,550 | 12/35 | Richards | 213—100 X |
| 2,246,406 | 6/41 | Wittmer | 213—100 |
| 2,897,982 | 8/59 | Larson | 213—100 |

EUGENE G. BOTZ, *Primary Examiner.*

LEO QUACKENBUSH, MILTON BUCHLER,
*Examiners.*